United States Patent
Davie et al.

(10) Patent No.: US 7,824,165 B2
(45) Date of Patent: Nov. 2, 2010

(54) SYSTEM FOR RESIN CURING

(75) Inventors: Alistair Davie, Carlisle (CA); Joseph Pelleja, Brampton (CA)

(73) Assignee: Comtek Advanced Structures Limited, Burlington, Ontario (CA)

( * ) Notice: Subject to any disclaimer, the term of this patent is extended or adjusted under 35 U.S.C. 154(b) by 478 days.

(21) Appl. No.: 11/774,303

(22) Filed: Jul. 6, 2007

(65) Prior Publication Data
US 2009/0011063 A1 Jan. 8, 2009

(30) Foreign Application Priority Data
Jul. 6, 2006 (CA) .................................... 2551728

(51) Int. Cl.
*B29C 35/08* (2006.01)
(52) U.S. Cl. .................... 425/174.4; 425/144; 425/182; 425/195; 425/404
(58) Field of Classification Search ................ 425/404, 425/143, 144, 174.4, 182, 195, 446, 384, 425/403, 111, 508; 264/402
See application file for complete search history.

(56) References Cited

U.S. PATENT DOCUMENTS

| 4,828,472 | A | | 5/1989 | Itoh et al. |
| 5,207,956 | A | | 5/1993 | Kline et al. |
| 5,591,370 | A | * | 1/1997 | Matsen et al. ................ 219/645 |
| 6,017,484 | A | * | 1/2000 | Hale ........................... 264/510 |
| 6,068,722 | A | * | 5/2000 | Yu et al. ...................... 156/137 |
| 6,490,501 | B1 | | 12/2002 | Saunders |

* cited by examiner

*Primary Examiner*—Maria Veronica D Ewald
(74) *Attorney, Agent, or Firm*—Patrick J. Hofbauer

(57) ABSTRACT

Among other things, there is disclosed a system for curing a resin in a composite structure having one or more interconnected cure volumes, the cure volumes having one or more heatable surface zones. The system comprises a mould comprising a mould base portion adapted to support the composite structure and a mould closure portion adapted to overlie the mould base portion in sealable relation to define a mould chamber containing the composite structure within. The system further comprises a plurality of heating units each selectively positionable about the mould. The heating units transmit heat to the mould by radiation, and the mould heats the one or more surface zones of the cure volumes.

30 Claims, 8 Drawing Sheets

SYSTEM FOR RESIN CURING

FIELD OF THE INVENTION

The present invention relates generally to the field of resin curing, and more specifically to an improved system for curing resin in a composite structure.

BACKGROUND OF THE INVENTION

Composite materials exhibit high strength and stiffness, as well as corrosion resistant properties. In addition, their light weight is particularly advantageous when compared to similar components constructed from metals. As such, there has been increasing interest in recent years in the use of parts and assemblies constructed from fiber reinforced composite materials in industries such as, for example, the aerospace industry, where parts and assemblies having high strength to weight ratios are desired.

Whether the resin has been infused between reinforcing fibres, or sheets are provided which have been pre-impregnated with resin (commonly and hereinafter referred to as "pre-preg" sheets), the manufacturing of composite structures requires that resins be cured in situ with layered reinforcing fibres. To produce a part or assembly exhibiting the above-described advantageous properties, curing must result in low porosity (i.e., a low number of voids within the composite structure) and a high and substantially uniform degree of cure throughout the entire composite structure.

Curing of resin in a composite structure commonly involves heating the structure so as to induce a cross-linking reaction between molecules of the resin, and a resulting increase in resin viscosity. Ideally, heating is continued until the increase in viscosity of the resin reaches a point whereat gelation occurs, such that the structure has solidified.

Prior art processes used to cure resin in composite structures are not adapted to adequately control the heating of the structure to achieve an optimal uniform level of cure throughout most composite structures, particularly those having more complex cross-sectional shapes. Further, prior art processes yielding products with consistently high quality and strength have required lengthy cure cycles, often in excess of 150 minutes per part. Thus, the inability to provide a cure system capable of quickly and uniformly heating the composite structure so as to achieve a uniform level of cure throughout has been a limiting factor in the use of composite structures in, for example, the aerospace industry.

Prior art curing processes have exhibited the additional disadvantage of being accompanied by high costs, due in large part to the fact that their use necessitates consumption of relatively large quantities of energy.

Moreover, the curing of resin in composite structures having cross-sectional thicknesses greater than about 1.0 inch in any cross-sectional plane (hereinafter referenced in this specification as "thicker cross-sections") has heretofore been particularly problematic, since a specific and controlled rate of heat is required to cure each such thicker cross-sections to achieve the same degree of cure therein as in other areas of the composite structure at the end of the cure cycle.

It is well known in the art to cure resin in composite structures using an autoclave. Traditionally, curing systems including autoclaves have been the most common means of producing high strength and high quality composite parts. In such processes, a resin impregnated structure is placed in the autoclave, then heated gas at a raised temperature and pressure flows from an inlet end to an outlet end, to thereby heat the composite structure by convective currents circulating within the autoclave. Temperature can vary greatly from one location to another within the autoclave, and no control is typically provided over this variation. For example, the side areas of an autoclave tend to be cooler than the middle areas of an autoclave. As such, the temperature cannot be precisely controlled in all areas of an autoclave and, more importantly, at specific locations throughout the composite structures produced using such systems. This is particularly problematic with respect to composite structures having multiple cross-sectional thicknesses throughout, which ideally require differing rates of heat to be applied at different locations in order to each reach a high and uniform degree of cure. Thus, such controlled differential heating cannot be effectively carried out in prior art autoclave-based systems.

In addition, the use of convective heating means, such as autoclaves, is inefficient in terms of production cycle times, and in terms of energy consumption. This is so for several reasons, including but not limited to the following: i) a long warm-up period is required to bring the autoclave up to its critical operating temperature (at which cross-linking of the resin occurs); ii) a large quantity of energy must be expended to maintain the large volume of the autoclave at temperatures suitable for use in a curing system; iii) a long cure period is required to ensure that the cross-linking is complete throughout all locations of the composite structure; again, for composite structures having thicker cross-sections this is particularly troublesome, and process engineers will typically err on the side of caution in this regard by increasing the cure period; and, iv) a long cool down period is required before the cured composite structures can be safely removed from the autoclave for further production processing. Of course, a long warm up period is again required for the next part or batch of parts to be cured. Thus, in autoclave-based systems, curing times in excess of 150 minutes (exclusive of any necessary cooling time) are relatively common. This, of course, limits the number of composite parts or assemblies that can be produced in any given period of time.

Moreover, given the broad disparity between the volume of the composite structure (and that of any tooling which may be provided thereabouts) and that of the autoclave, the inefficiency of an autoclave from the standpoint of energy consumption per curing cycle is staggering.

It should further be noted that autoclave-based curing systems exhibit yet a further disadvantage, in that they require a very large initial capital investment to build and install. This cost, coupled with high ongoing operating costs, including increasing energy costs, represent a significant barrier to the more widespread use of composite parts and assemblies. Moreover, in an age of perhaps diminishing natural resources, any means of reducing energy consumption is advantageous; quite apart from monetary concerns.

It is desirable, from both quality control and safety standpoints, that all of the resin in the curing of composite structures, whether cured in an autoclave or otherwise, be cured to a substantially uniform level throughout, regardless of the variations in cross-sectional thickness and geometry throughout such structures. Thus, one further significant limitation of prior art curing processes, including those using autoclaves, is the difficulty of consistently achieving the aforesaid uniform level of cure throughout the structure, which is required in order for the final product to have the aforesaid quality and safety. As previously stated, complete and consistent curing of the resin in the structure becomes increasingly difficult as the cross-sectional thickness of the structure varies as between regions of the part. Ideally, thicker cross-sections, and indeed portions having different magnitudes of cross-sectional thickness, require the application of different and controlled rates of heating during the curing process, in order to uniformly cure all portions of the structure to substantially the same degree within a given cure cycle.

Attempts have been made in the prior art to develop curing systems which mitigate the disadvantages of using only an autoclave as their heat source. For example, U.S. Pat. No. 4,828,472 (Itoh et al.), issued May 9, 1989, discloses the use of elemental heaters positioned throughout a mould, which mould is placed in an autoclave environment; however, the elemental heaters of Itoh et al. are merely a supplemental source of heat for curing the workpiece. Thus, the aforementioned disadvantages inherent to autoclave-based curing systems, particularly the high costs (i.e., energy and otherwise) of using same and slow process times, are still experienced with the Itoh et al. system. Moreover, U.S. Pat. No. 4,828,472 does not disclose variable heating and control of the elemental heaters, which variation and control is necessary to achieve high, uniform levels of cure in composite structures having thicker cross-sections, or multiple varying cross-sectional thicknesses.

In addition, the use of elemental heaters such as those discussed in U.S. Pat. No. 4,828,472 (or other conductive heating means) as the primary heat source for a curing system does not substantially mitigate the aforementioned disadvantages of the prior art as related to energy consumption.

Thus, for the reasons mentioned above, amongst others, it has not been practical or economical (for reasons of, among other things, high energy consumption, as discussed above) using known prior art systems or techniques to cure resin in composite structures having thicker cross-sections and/or large thickness variations. There thus continues to exist in the prior art, amongst other things, a need to address these and other limitations, which need is increasing over time as, for example, the aerospace industry looks to increase the variety, complexity and size of composite parts and assemblies used in the construction of airplanes and spacecraft to, amongst other things, reduce weight 62, fuel consumption and cost.

It is thus an object of this invention to obviate or mitigate at least one of the above mentioned disadvantages of the prior art.

SUMMARY OF THE INVENTION

In accordance with the present invention there is disclosed a system for curing a resin in a composite structure. The composite structure has one or more interconnected cure volumes. The cure volumes have one or more heatable surface zones. The system comprises a mould, having a mould base portion and a mould closure portion. The mould base portion is adapted to support the composite structure, and the mould closure portion is adapted to overlie the mould base portion in sealable relation to define a mould chamber containing the composite structure. The system further comprises a plurality of heating units each selectively positionable about the mould. The heating units transmit heat to the mould by radiation and the mould heats one or more of the surface zones of the composite structure.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF AN EXEMPLARY EMBODIMENT

Figure 7:
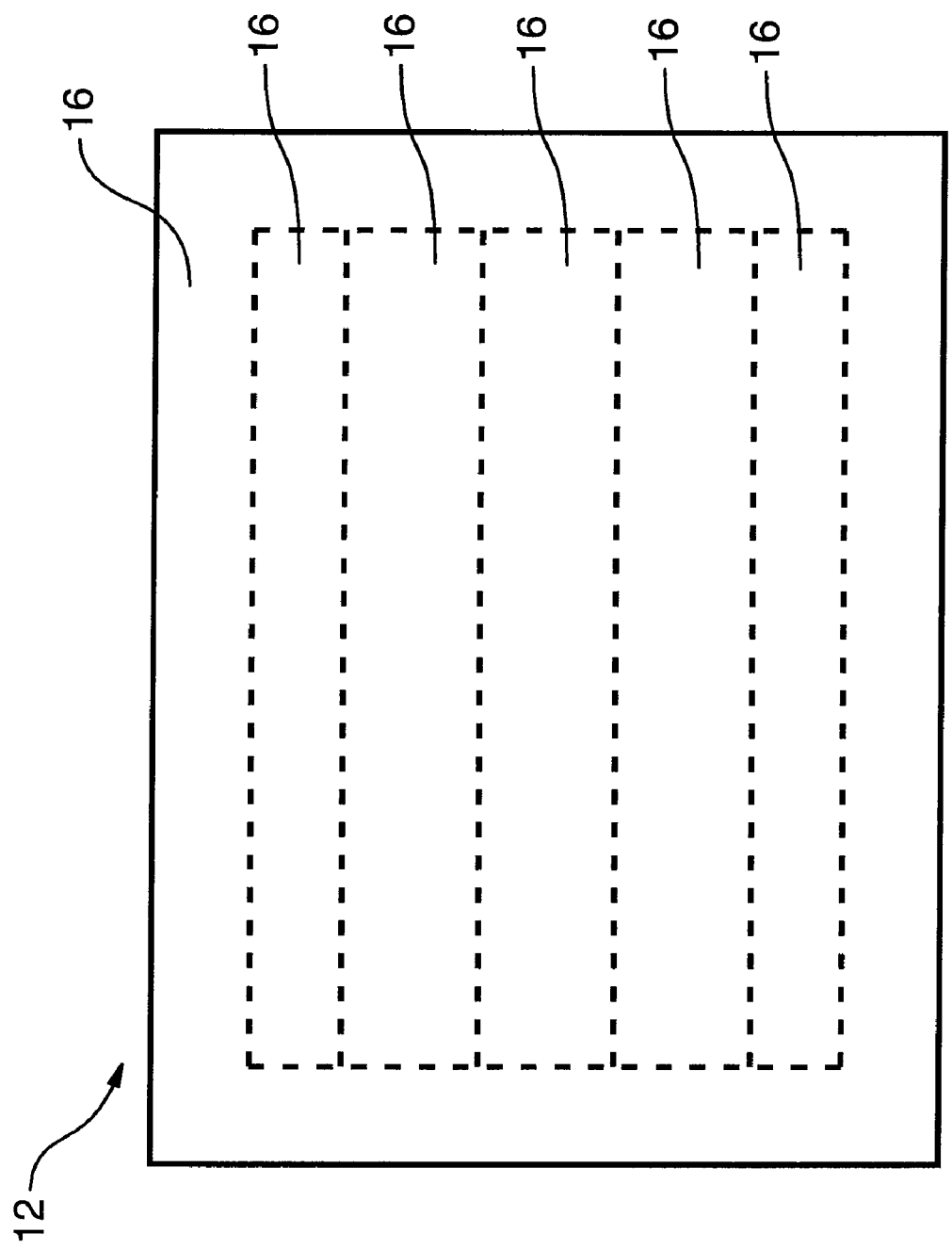
FIG. 7 is a bottom plan view of the composite structure of FIG. 1, with all other structures removed for clarity of illustration, and showing, in phantom outline, the heatable surface zones on the underside of the composite structure.

Referring now to the Figures, there will be seen a system 20 for curing a resin 10 in a composite structure 12 in accordance with but one non-limiting embodiment of the present invention. The composite structure 12 has one or more interconnected cure volumes 14 exhibiting a variety of cross-sectional thicknesses of the composite structure 12, with each separated from one or more others by notionally defined boundaries (indicated by dotted lines), as seen in FIGS. 3A, and 4. The cure volumes 14 have heatable surface zones 16, as will be appreciated from a consideration of FIGS. 3A, 4, and 7. As will be appreciated by one skilled in the art, the composite structure 12 is comprised of a plurality of layers of a fiber containing textile roving material, which layers are typically pre-adhered to one-another and pre-formed into a desired shape, as is known in the art, so as to form a core for the particular composite part or assembly being manufactured. As well known in the art, the fibers which make up the layers may be chosen from a group comprising, but not limited to, Kevlar™ woven fiber, Kevlar™ unidirectional fiber, woven glass fiber, unidirectional glass fiber, woven carbon fiber and unidirectional carbon fiber. As is well known in the art, the resin 10 is impregnated between the layers prior to curing. Further, the composite structure 12 to be cured could be made up of what are referred to in the art as "pre-preg" sheets, or could, as in the composite structure 12 shown in the Figures, be produced using for example, vacuum-assisted resin transfer moulding (VARTM), or analogous processes. The list of resins that can be used with the present system 20 includes, but is not limited to, epoxy, cyanate ester, polyester and phenolic resins.

The shapes and dimensions of the cure volumes 14 are selected based on, inter alia, the various cross-sectional thicknesses of the composite structure 12. Cure volumes 14 having different cross-sectional thicknesses as shown, necessitate application of heat to the heatable surface zones 16 thereof at different watt densities, in order to achieve substantially the same degree of cure throughout all the resin 10 in the composite structure 12 at the same time. Thicker cross-sections generally require the application of heat at higher watt densities than do thinner cross-sections (though that is not necessarily the case in all instances—in some instances the curing reaction is exothermic and application of less heat to thicker cross-sections may be necessary), at least where the total cure cycle is to be kept as short as practicable. As such, and where practicable, each cure volume 14 will be selected to have a substantially uniform cross-sectional thickness. As stated above, the cure volumes 14 each have one or more heatable surface zones 16. The heatable surface zones 16 together comprise substantially the entire surface of the composite structure 12, as will be appreciated from a consideration of FIG. 1. There may, but need not necessarily, only be one heatable surface zone 16 per cure volume 14; however, in many instances, the cure volume 14 will span the entirety of the cross-sectional thickness of the composite structure 12, as will be appreciated from a consideration of FIGS. 3A and 4, necessitating the cure volume 14 to have at least a second heatable surface zone 16, as shown in FIGS. 3A and 4. The selection of the number and dimensions of the heatable surface zones 16 may vary greatly, and will be based upon the overall geometry of the composite structure 12; that is, the dimensions of the cure volumes 14, and the geometry of the surface of the particular composite structure 12, among other things. The selections of the dimensions and arrangements of cure volumes 14 and their associated heatable surface zones 16 are matters of routine design choice for one skilled in the art, which selections may be assisted by the use of computer simulation of curing, using software such as, for example, MSC Nastran™ (available from MSC Software Corporation, Santa Ana, Calif., U.S.A.).

As seen in FIG. 4, the system 20 also includes a mould base portion 24 adapted to support the composite structure 12. The mould base portion 24 may be constructed of wood, steel, aluminum, or plastic materials, but is preferably constructed from a composite material or a metallic alloy having a low coefficient of thermal expansion, and may advantageously be substantially formed, as shown in the Figures, to correspond in shape to substantially the entire overlying portion of the composite structure 12. As seen in FIG. 4, the mould base portion 24 typically includes (but need not necessarily include) a central body portion 26 and a peripheral flange portion 28. In many applications, the portion of the composite structure 12 contacting the peripheral flange portion 28 would be a distinct cure volume 14, as will be appreciated from a consideration of FIGS. 3A, 4, and 7.

The system 20 also includes a mould closure portion 30 adapted to overlie the mould base portion 24, in sealable relation therewith, as seen in FIG. 4, so as to define a mould chamber 32. In a similar manner to the mould base portion 24, the mould closure portion 30 may also be constructed of wood, steel, aluminum, plastic, metallic alloy, or composite materials; however, and as is shown the Figures, the mould closure portion 30 may be a known form of vacuum bag 30, which vacuum bag 30 may be composed of such commercially available materials as nylon, polypropylene, silicon rubber, and the like. Furthermore, the vacuum bag 30 needs to be composed of a material capable of withstanding temperatures in the approximate range of about 200-450° F. for periods as long as approximately 300 minutes, in order to cure substantially all the resin 10 in the composite structure 12, depending on the type of resin 10 being cured and the geometry of the particular composite structure 12. The selection of the material to be used for construction of the mould closure portion 30 is a matter of routine design choice to be made by those skilled in the art, which choice may be influenced by, for example, the means of impregnation of resin 10 into the layers of the composite structure 12. For example, in applications according to the present invention involving the aforementioned "pre-preg" sheets (not shown), it may be advantageous to employ more rigid materials in the construction of the mould closure portion 30, such as the composite materials discussed hereinabove.

As best shown in FIG. 4, a seal 34 joins the vacuum bag 30 and the mould base portion 24 in sealed relation to one another. For ease of illustration, the seal 34 is shown as located on the peripheral flange portion 28; however, it could be located at different positions between the mould base portion 24 and the vacuum bag 30, depending upon the shape of the particular composite structure 12 and the materials used to construct the mould base portion 24 and mould closure portion 30. Again, routine design choice plays a role in the shape and position of the seal 34 as between particular workpiece applications. The seal 34 may be constructed from an adhesive material, a rubber material, a liquid material, a putty, or, as shown, a semi-liquid sealant such as, but not limited to, epoxy and the like. The seal 34 is preferably releasable and resealable, but need not be so. One skilled in the art will recognize that the seal 34 may be any seal 34 means, including self-adhesive gasketing material, capable of maintaining a sealed bond between the mould base portion 24 and the mould closure portion 30 at the above-mentioned temperature levels. The seal 34 may also be a mechanical device such as, for example, a gasket with suitable clamps depending upon, again, the materials used to construct the mould base portion 24 and mould closure portion 30, as well as the suitability of such materials for use at the elevated temperature levels mentioned hereinabove.

The system 20 also includes a plurality of heating units 40 that are each selectively positionable about the mould 22. The heating units 40 transmit heat to the mould 22 by radiation. In this specification and the appended claims the term "by radiation" is hereby defined to mean substantially all transmission of heat is by way of radiation, without any significant transfer of heat by way of conduction from the heating units 40 to the mould 22, or by way of convective transfer of heat from the heating units 40 to the mould 22 via any medium, or media, therebetween. The heating units 40 need not all be heating at the same time. Those heating units 40 actually transmitting at any particular time are referred to herein as "energized".

The mould 22 (i.e., at least a portion thereof) receives the heat transmitted by radiation from the heating units 40 and is heated thereby. The mould 22 transfers a portion of the received heat to one or more of the heatable surface zones 16 of the composite structure 12. One skilled in the art will recognize that the presence of the mould 22 between the heating units 40 and the composite structure 12 may introduce some inefficiency in terms of heat transfer; however, such a skilled person will further recognize that the mould 22

(or an analog thereof) is necessary for retention of the composite structure 12 in the desired post-curing shape, and that such inefficiency will be minimal through use of materials well known in the art.

The heating of the heatable surface zones 16 by transfer of heat from the mould 22 may occur by, for example, convection of heat within any gaps that may exist between the mould 22 and the composite structure 12; however, it may also, or alternatively, occur via conduction from the mould 22 to the composite structure 12.

The heating units 40 are adapted to transmit heat to the mould 22 at one or more respective variable heating unit levels. In this specification and the appended claims, the term "variable heating unit level" means a level, wherein a target quantity of energy in the form of heat is transmitted by one or more of the heating units 40 by radiation, to the mould 22, and therefrom to one or more of the cure volumes 14 via the heatable surface zones 16, thereby providing the ability to heat the composite structure 12 to temperatures necessary for the curing reaction to occur, and the ability to closely vary the temperature of each cure volume of the composite structure 12 as per unit time. By way of comparison, heating each cure volume at a respective variable heating unit level contrasts with the prior art practice of heating composite structure 12 in autoclaves wherein temperature variations, as between areas of the structure having different cross-sectional thicknesses, are largely un-variable and uncontrollable, and require the expenditure of very high quantities of energy in order to heat the autoclave chamber. Further, heating each cure volume at a respective variable heating unit level also contrasts with the prior art practice of heating the entire composite structure 12 to a uniform temperature throughout regardless of variations in the cross-sectional thickness thereof. Moreover, it has not been prior art practice to provide a means of heating areas of the structure having different cross-sectional thicknesses, or which are otherwise distinguishable in terms of the quantity of energy in the form of heat that needs to be applied to each of them in order to substantially cure all the resin 10 therein. Heating by radiation serves to greatly increase efficiency of energy consumption as it allows for the use of heating means (i.e., the heating units 40) that consume smaller quantities of energy per unit time. That is, heating each cure volume 14 at a respective variable heating unit level is also different from prior art methods and apparatuses which specify a set temperature throughout an autoclave, and hence, the mould chamber 32. In the present invention, the quantity of heat applied to particular cure volumes of the composite structure 12 (which is critical to more consistent and heightened product quality) can be closely controlled and varied. Moreover, in applying such heat by radiation from the heating units 40 to the mould 22, the quantity of energy (e.g., electricity) required to complete the curing cycle can be minimized.

The variable heating unit level at which heat is provided to each heatable surface zone 16 may, of course, be altered over time throughout the curing process. As such, an additional parameter over which control can be exercised in a curing process exists as a result of providing heat to the cure volumes 14 at a respective variable heating unit 40 level.

Figure 5:
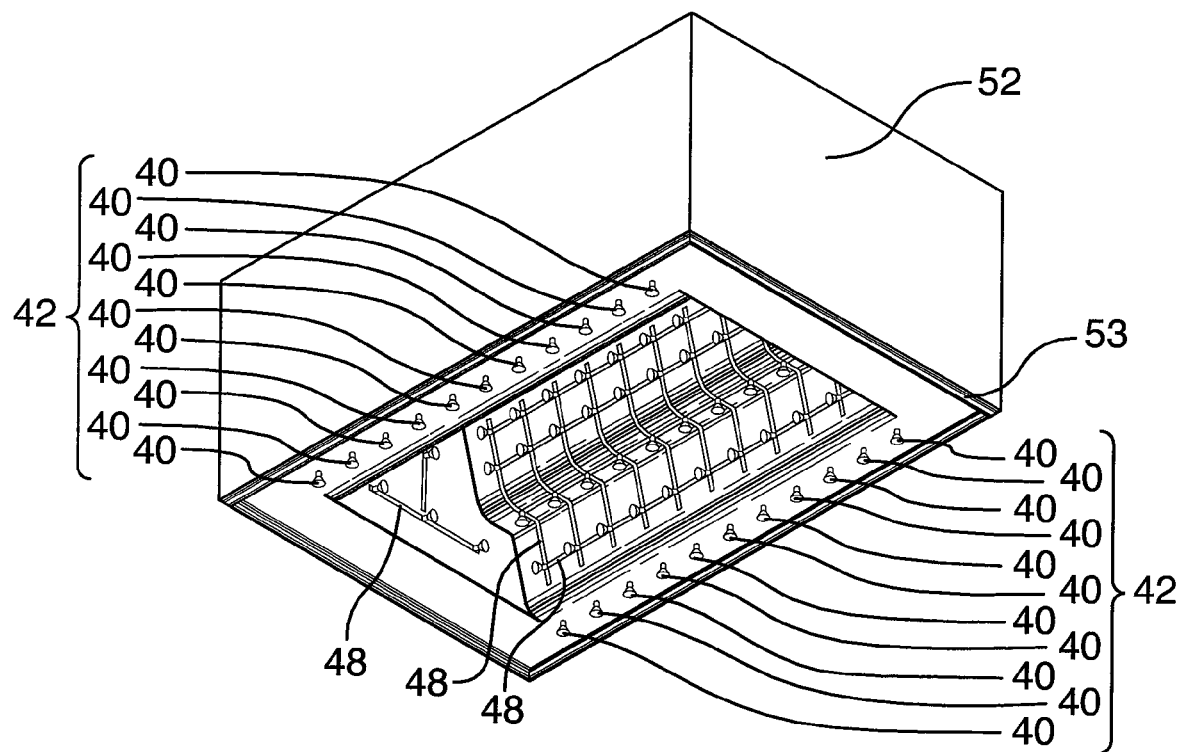
FIG. 5 is a front right perspective view, from below, of the upper housing portion of the system of FIG. 1.

In some embodiments of the present invention, arrays 42 comprised of one or more heating units 40, as seen in FIG. 5, will preferably each be arranged in operative heating relation (as will be appreciated from a consideration of FIGS. 3, 3A and 5) to a single heatable surface zone 16, with the mould 22 interposed therebetween. Thus, the variable heating unit level at which heat is provided to each heatable surface zone 16 need not be unique, as compared to the variable heating unit levels of the other heatable surface zones 16.

As described above, the plurality of heating units 40 comprises one or more arrays 42 of the heating units 40, each of the arrays 42 comprising one or more of the heating units 40, as will be appreciated from a consideration of FIG. 5. Each of the arrays 42 is preferably positionable in operative heating relation to a corresponding one of the heatable surface zones 16, with the mould 22 interposed therebetween, as will be appreciated from a consideration of FIGS. 3, 3A, 5 and 6.

Providing an appropriate number of heating units 40 in each array 42—e.g., for each heatable surface zone 16—may serve to better tailor the system 20 to the properties of the particular composite structure 12. Such optimization contributes to the high level of control during and efficiency of the curing process offered by the system 20 of the present invention.

The number of heating units 40 used in any particular application can and will vary significantly depending on factors including, but not limited to, the variations in and magnitude of cross-sectional thicknesses of the composite structure 12 and the heat-providing capacity of each heating unit 40. In this regard, one skilled in the art will recognize that the power of each heating unit 40 must be balanced against energy requirements for the operation of same. As noted above, heating by radiation is advantageous in this regard. The precise placement of the heating units 40, as well as the number to be used in any particular application and their density of placement per unit area, is a matter of routine design choice for one skilled in the art, which choice may be assisted by computer simulation of the curing process, as otherwise described herein.

Each of the heating units 40 may preferably be a commonly available type of halogen light bulb 40 of a Wattage in the order of approximately 25 to 100 Watts, though all of the heatings units 40 employed in a particular embodiment of the present invention need not all be the same wattage. Low voltage halogen light bulbs are particularly preferred. Moreover, it may be preferable, and helpful in tailoring the system 20 to the particular composite structure 12, to employ multiple different bulbs.

Figure 4:
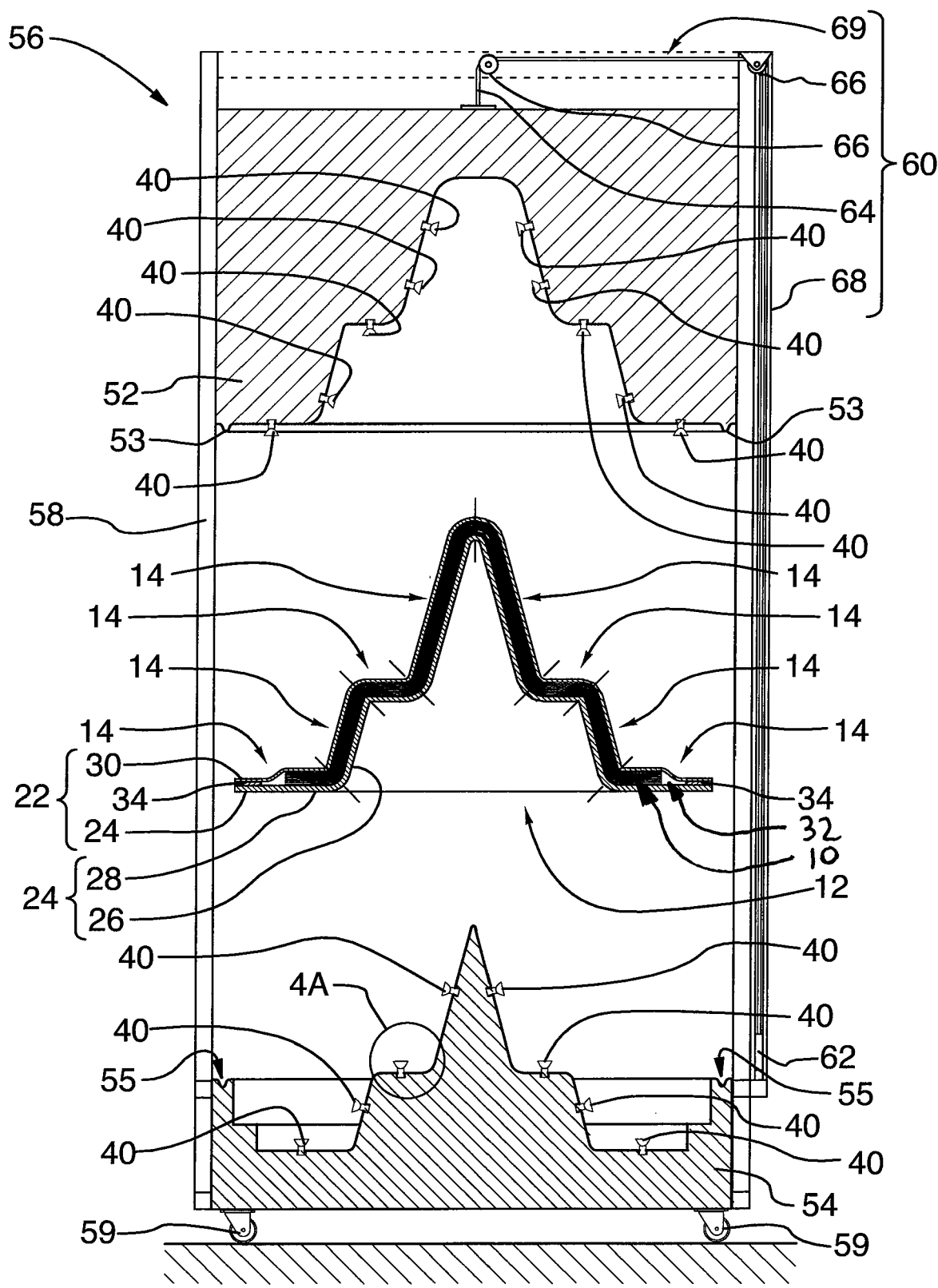
FIG. 4 is a sectional view along sight line 4-4 of FIG. 1.
Figure 4A:
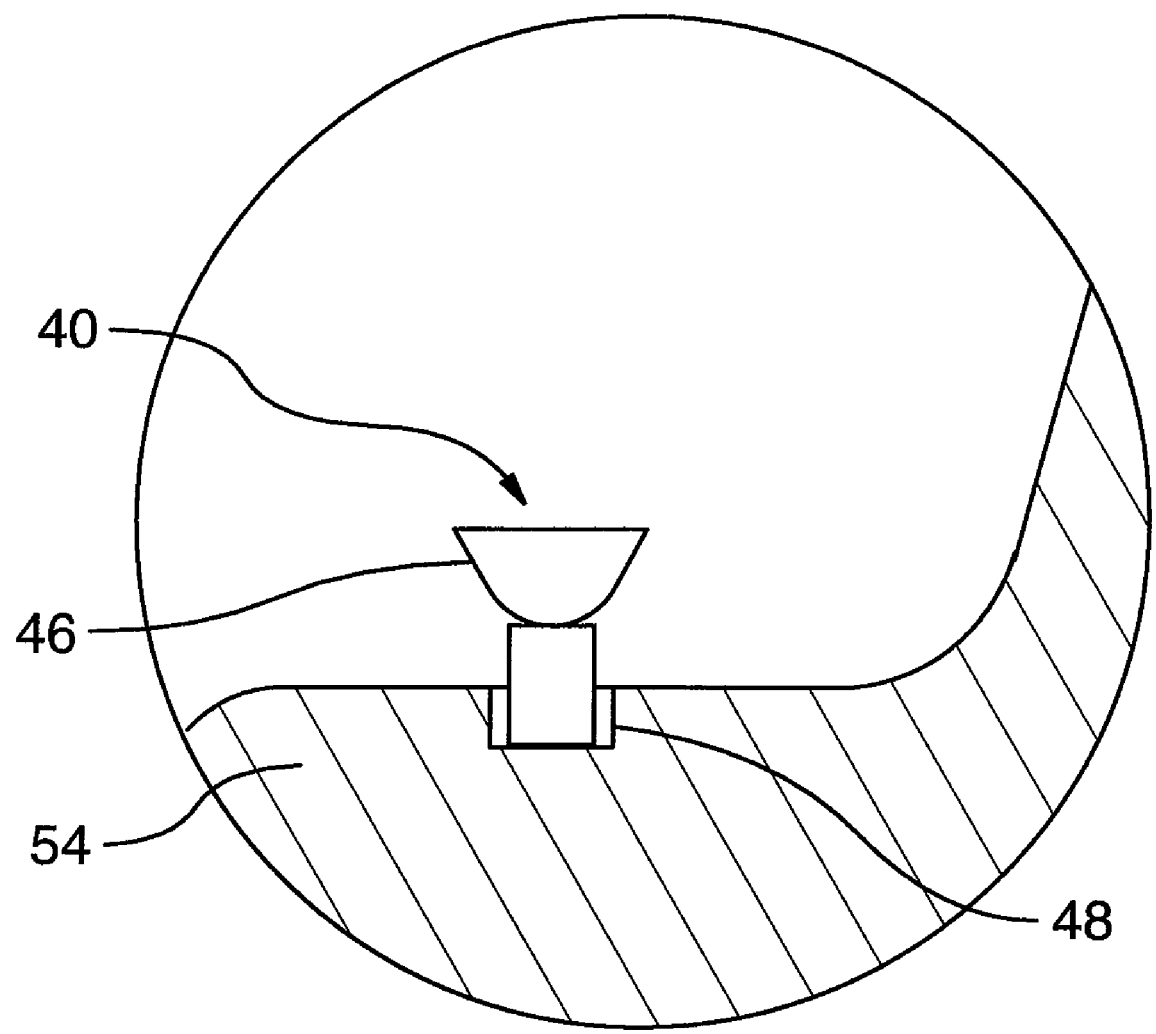
FIG. 4A is an enlarged view of the encircled area 4A of FIG. 4.

Each such halogen light bulb 40 preferably includes a reflector means 46, as seen in FIG. 4A, that serves to reflect light when energized toward the mould 22 when the system 20 is in operation, with the reflected light otherwise not having been directed toward the mould 22.

The system 20 preferably also includes a housing 50 comprised of two or more matable housing portions, preferably being an upper housing portion 52 and a lower housing portion 54, as shown in FIGS. 1, 2, 3, 3A and 4. As will be appreciated from a consideration of FIGS. 3 and 3A, the housing 50 is shaped, configured and otherwise adapted to selectively enclose the mould 22.

Figure 1:
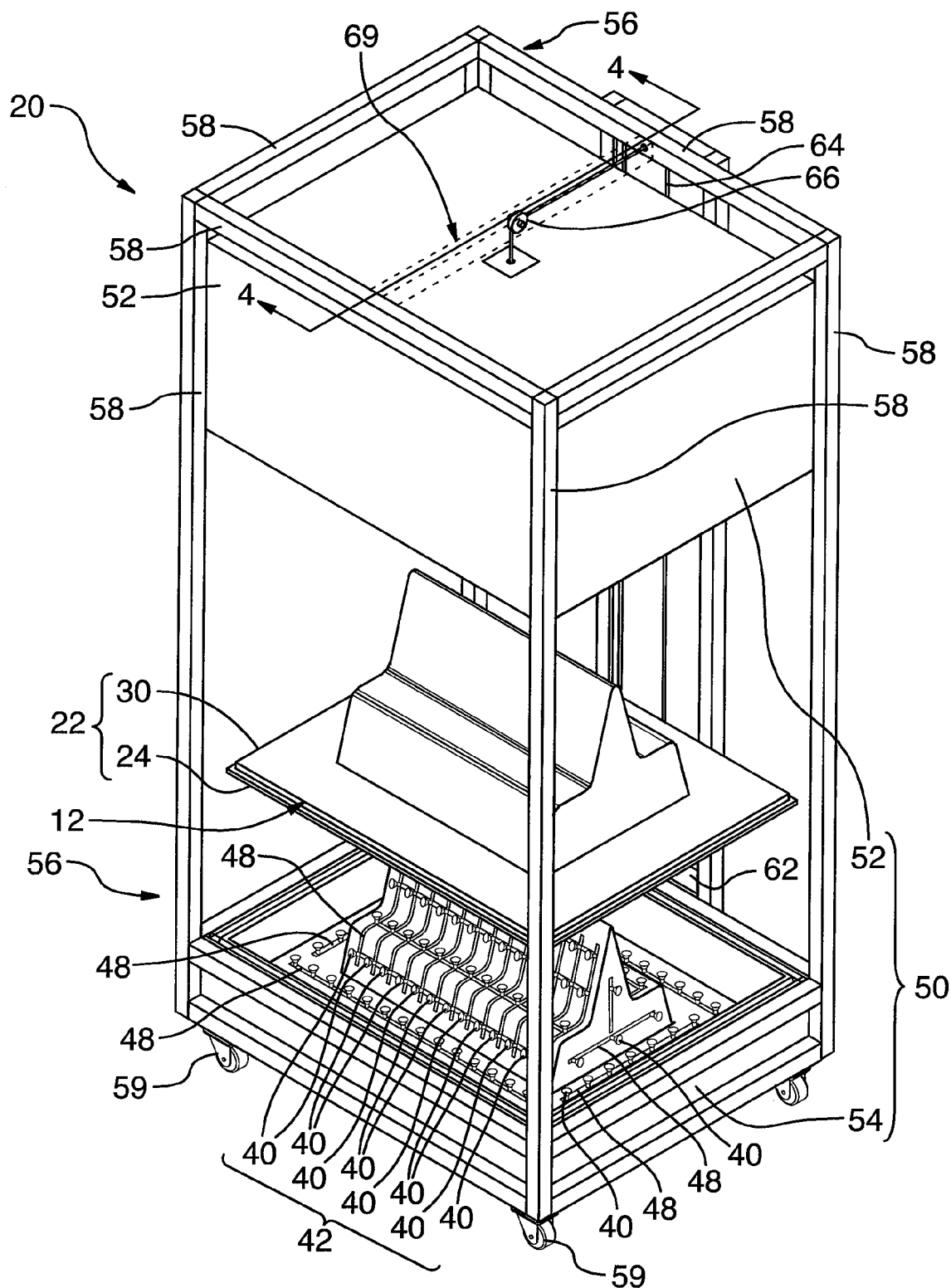
FIG. 1 is a right side perspective view, from above, of a system according to the present invention, shown in a semi-exploded configuration, with the housing shown in the open configuration, with the temperature sensing means, programmable control means, and cure sensing means removed for clarity of illustration.
Figure 2:
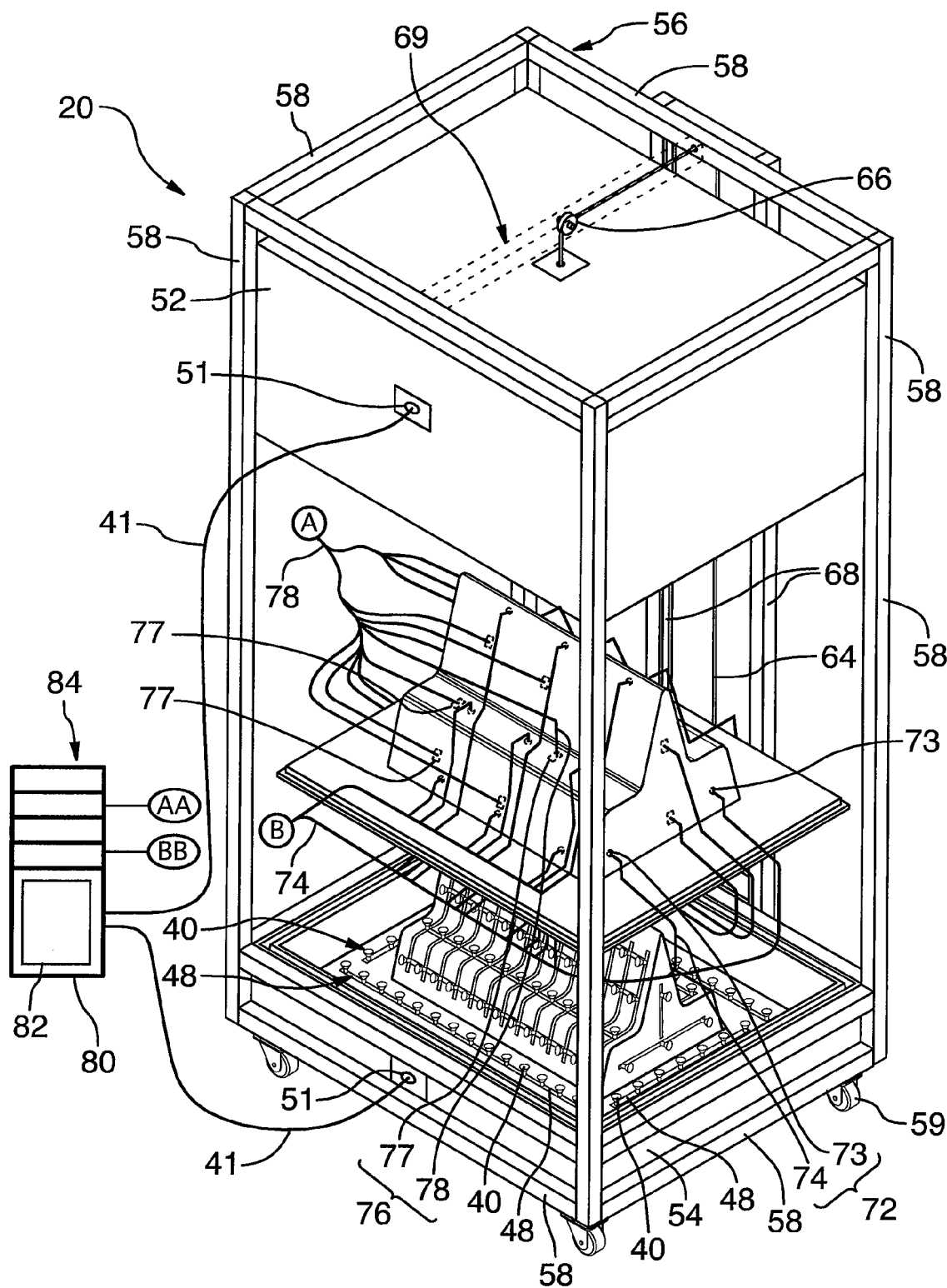
FIG. 2 is a view similar to FIG. 1, with the temperature sensing means, programmable control means, and cure sensing means shown therein.
Figure 3:
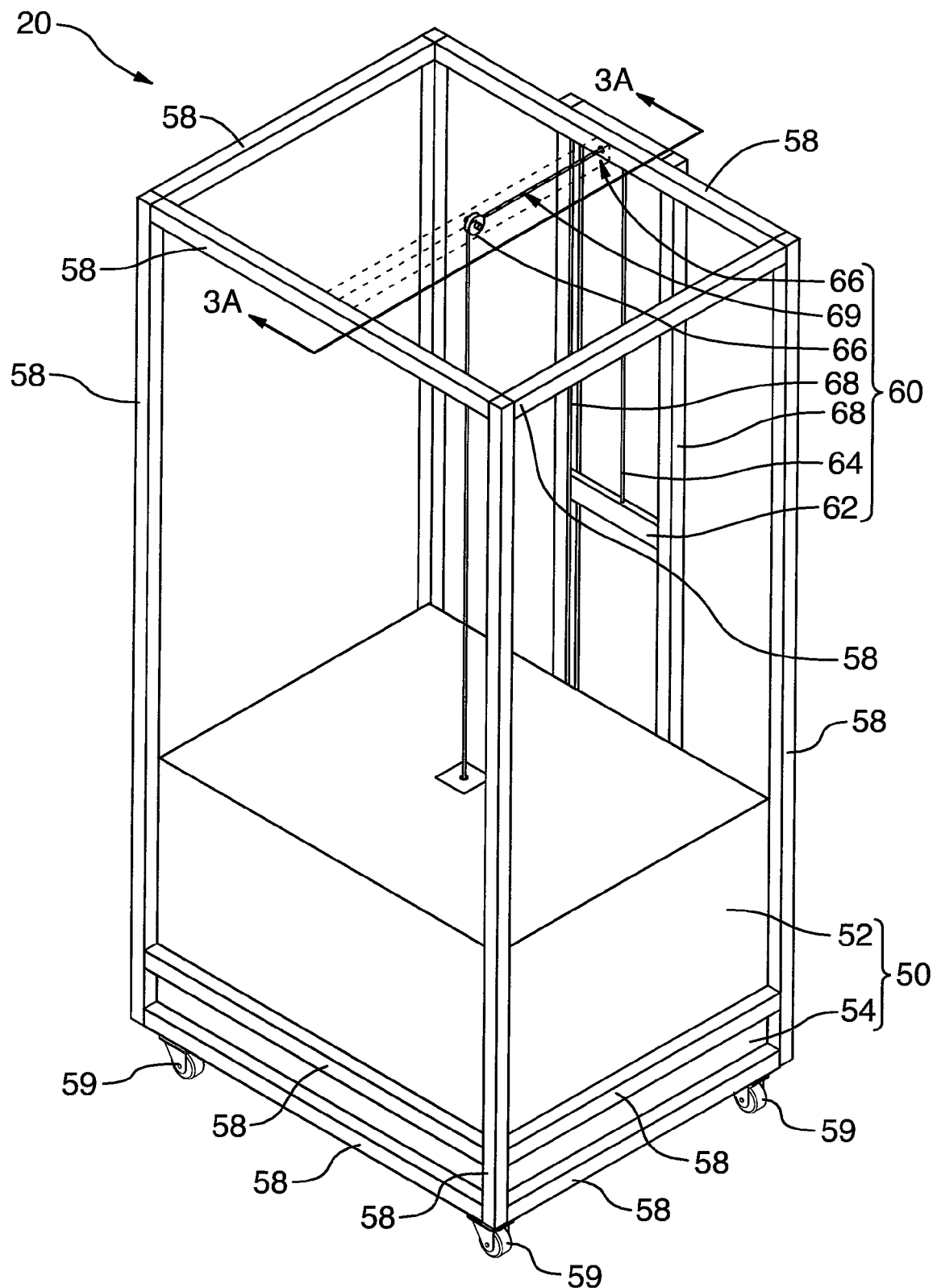
FIG. 3 is a view similar to FIG. 1, with the housing in a closed configuration.
Figure 3A:
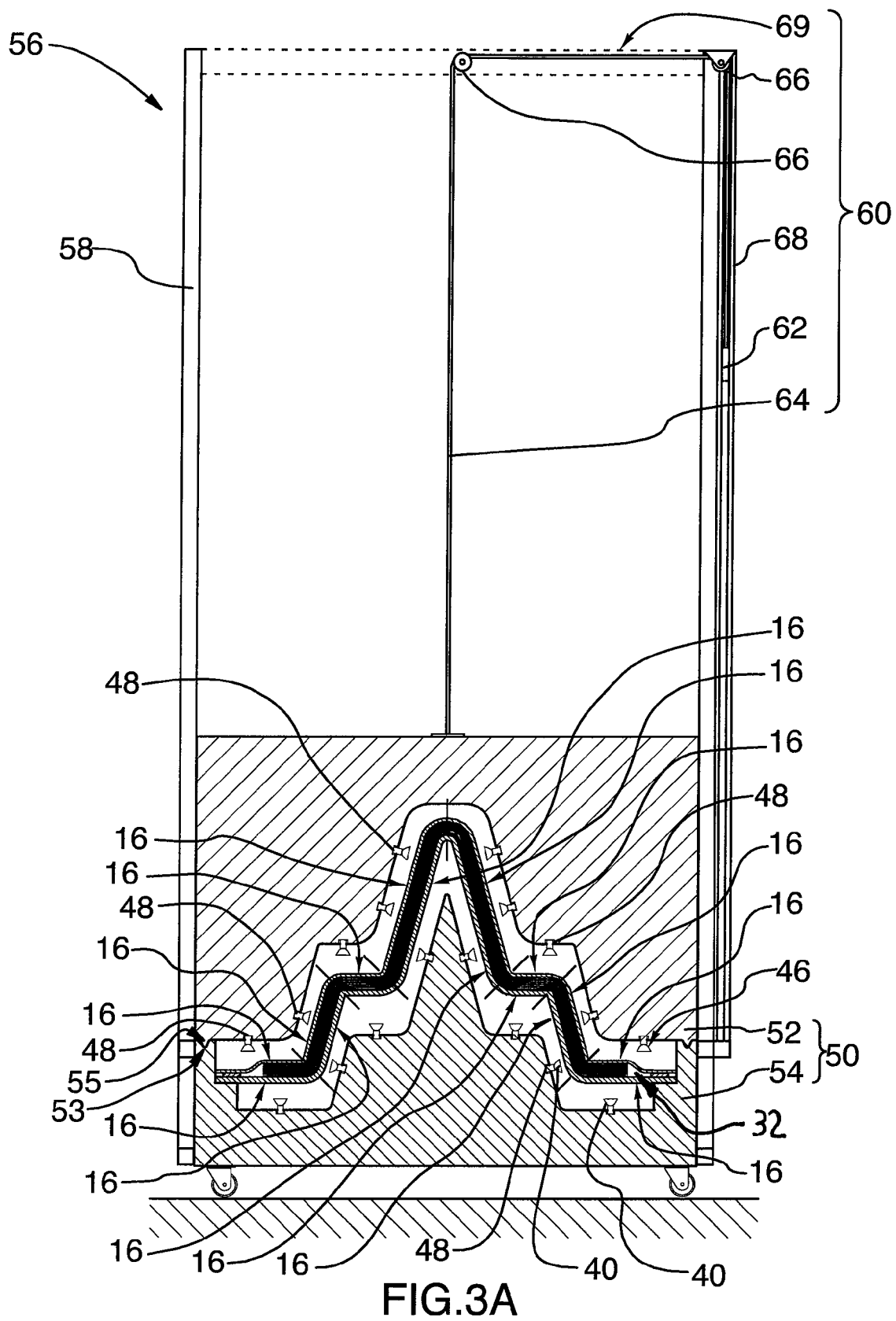
FIG. 3A is a sectional view along sight line 3A-3A of FIG. 3.
Figure 6:
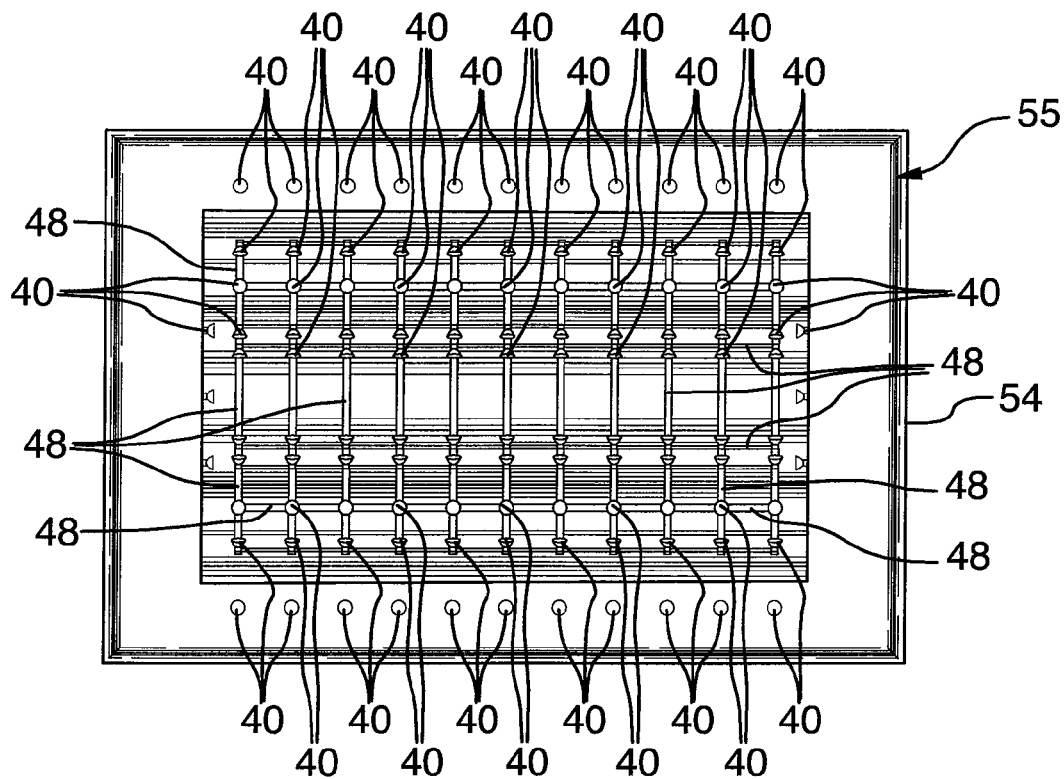
FIG. 6 is a top plan view of the lower housing portion of the system of FIG. 1.

One or more of the housing 50 portions are movable so as to allow for transition of the housing 50 between an open configuration of the housing 50, as shown in FIGS. 1, 2 and 4, and a closed configuration of the housing 50, as shown in FIGS. 3 and 3A. In the closed configuration, the housing portions 52 and 54 are mated in close fitting relation about the mould 22. In the open configuration, the housing portions 52 and 54 are unmated and positioned sufficiently remotely from one another to allow for removal of the mould 22 from therebetween, as will be appreciated from a consideration of FIG. 1. In order to facilitate mating of the housing portions 52 and 54, the upper housing may preferably have an optional tongue 53 projecting downwardly from the periphery of the bottom surface thereof, as shown in FIG. 5. The lower housing portion 54 may have an optional complimentary groove 55 defined in the periphery of the upper surface thereof, as shown in FIG. 6. The tongue 53 and groove 55 mate when the housing 50 is in the closed configuration, as shown in FIG. 3A. In the embodiment shown in the Figures, the lower housing portion 54 is fixed and the upper housing portion 52 is vertically movable; however, alternate configurations may be employed where any one or more of the housing portions 52 and 54 may be movable so as to transition the entirety of the housing 50 between the aforesaid open and closed configurations thereof. To facilitate movement between the open and closed configurations of the housing 50, the system 20 may preferably further comprise a mechanism 60, shown in FIGS. 3 and 3A, for moving the housing portions 52 and 54 so as to move the housing 50 between its open and closed configurations. While this mechanism 60 is shown in the Figures as including two pulleys 66, a cord 64, guide slots 68 and a counterweight 62, one skilled in the art will recognize that this mechanism 60 could be any other means of facilitating movement between the open configuration and the closed confirguration of the housing 50, e.g., gas struts, and could be, for example, motorized.

The system 20 may additionally comprise a frame 56 surrounding the housing portions 52 and 54. The frame 56 includes a plurality of metal rails 58 mechanically bonded or welded to one another to form an open rectangle. The lower housing portion 54 may be fixed to the frame 56. The frame 56 serves to guide the housing portions 52 and 54 between their respective positions in each of the open and closed configurations of the housing 50.

The frame 56 may additionally comprise an inverted U-shaped beam 69 spanning the top of the frame 56, and having the pulleys 66 rotatably mounted therein to guide the cord 64 that joins the counterweight 62 to the upper housing portion 52 along its path. The beam 69 is shown in phantom outline to better illustrate the pulleys 66 therein. As will be appreciated from a comparison of FIGS. 1 and 3, the counterweight 62 will serve to counterbalance the mass of the upper housing portion 52 and will thus obviate the requirement for lifting or supporting of the entire weight thereof during movement of the upper housing portion 52, thereby facilitating movement between the open and closed configurations of the housing 50. The frame 56 may additionally comprise casters 59 as shown in the Figures.

As described above, each of the housing portions 52 and 54 is preferably shaped to substantially match the shaping of a portion of the mould 22. In this regard, one skilled in the art will recognize that the housing portions 52 and 54 could be constructed and shaped as necessary to conform to the geometry of the particular mould 22 to be housed therebetween. Such shaping facilitates operative positioning of the heating units 40 adjacent the mould 22 as shown in FIG. 3A for heating efficiency.

The housing portions 52 and 54 may preferably each be comprised of any material or combination of materials having a high thermal resistance, so as to minimize transfer of heat therethrough in directions other than towards the mould 22. The material or materials making up the housing 50 must also be able to withstand exposure to temperatures of the magnitude and for the duration mentioned hereinabove.

As shown in FIGS. 5 and 6, the heating units 40 are preferably movably mounted on the housing 50 so as to allow for manual or mechanical manipulation or positioning, so as to most accurately conform to a particular mould 22 and provide for efficient heating thereof by accurate direction of the reflector means 46 of the heating units 40. In this regard, the system 20 may preferably, but need not necessarily, further comprise means 48 for adjusting the distance between each of the heating units 40 and the mould 22. These means 48 could include, among other things, pivot means (not shown) or the tracks 48 shown in FIGS. 1, 2, 3A, 4, 5, and 6. As will be appreciated by one skilled in the art, these tracks 48 facilitate both lateral translation, which may or may not be effected manually, of the heating units 40 with respect to the mould 22, and projection and/or retraction of the heating units 40 (i.e., by way of adjustment of the depth of the heating unit 40 in the track 48) with respect to the mould 22.

One or more temperature sensing means 72, shown in FIG. 2, are preferably further included as part of the system 20 of the present invention, for monitoring one or more temperatures within the one or more cure volumes 14. Each temperature sensing means 72 includes temperature sensors 73 and one or more temperature sensing lines 74 operatively connecting each temperature sensor 73 to a programmable control means 80, as seen in FIG. 2. For ease of illustration, the temperature sensing lines 74 are shown in FIG. 2 as being bundled into a harness and converging at point "B". One skilled in the art will appreciate that these temperature sensing lines 74 connect to the programmable control means 80 at point "BB" in FIG. 2. As is well known in the art, the temperature sensors 73 may be, for example, thermocouples, infrared-based sensors, or the like.

One or more cure sensing means 76, seen in FIG. 2, may further preferably be included as part of the system 20 of the present invention, for monitoring one or more cure parameters within the one or more cure volumes 14. The cure parameters monitored include one or more of degree of cure of the resin 10, and viscosity of the resin 10. Each cure sensing means 76 includes a cure sensor 77 together with one or more cure sensing lines 78 operatively connecting each cure sensor 77 to the programmable control means 80. For ease of illustration, the cure sensing lines 78 are shown in FIG. 2 as being bundled into a harness and converging at point "A". One skilled in the art will recognized that these cure sensing lines 78 connect to the programmable control means 80 at point "AA" in FIG. 2. The cure sensors 77 may preferably be known types of ultrasonic transducers, and may also be, but are not limited to, resistance, capacitance, electrically and dielectrically based sensors.

The cure sensing lines 78 and the temperature sensing lines 74 may preferably be insulated copper wires. Each may also be composed of any material capable of acting as a conduit for transmission of one or more electronic signals. In some embodiments of the present invention, and as is well known in the art, the temperature lines and cure lines may each be multiplexed, as suggested by FIG. 2.

Temperature sensors 73 and/or cure sensors 77 may be positioned on one or more of the mould closure portion 30 and the mould base portion 24, as will be appreciated from a consideration of FIG. 2. One skilled in the art will recognize that the total numbers of temperature sensors 73 and/or cure sensors 77 used in any particular production application can and will vary significantly as between different applications. The number and placement of the temperature sensors 73 and/or the cure sensors 77 is a matter of routine design choice for one skilled in the art, which choice may be based on, for example, the shape and configuration of the composite structure 12; however, the temperature sensors 73 and cure sensors 77 are preferably positioned such that at least one of each is located so as to monitor temperatures and cure parameters, respectively, within each cure volume 14.

The programmable control means 80, shown in FIG. 2, is preferably responsive to the temperature sensing means 72 and to the cure sensing means 76 and operatively connected, as described hereinbelow, to the heating units 40 by unit supply lines 41. For ease of illustration, but one unit supply line 41 is shown in FIG. 2, connected to each of the housing portions 52 and 54 through a conduit 51. One skilled in the art will recognize that the conduits 51 will be shaped so as to allow for passage of the unit supply lines 41 into the housing portions 52 and 54, whilst minimizing loss of heat therethrough. One skilled in the art will further recognize that each of the unit supply lines 41 may be bundled from the control means to the housing portions 52 and 54, and separate with the housing portions 52 and 54 so as to operatively connect each heating unit 40 to the programmable control means.

The unit supply lines 41 may be composed of any material capable of acting as a conduit for transmission of electricity at the levels described herein, and may preferably be known types of power transmission cables, such as, for example copper wire.

The programmable control means 80 may, but need not, further comprise a relay means 84, interconnected between the programmable control means 80 and the heating units 40 by the unit supply lines 41, for supplying variable levels of electrical current to the heating units 40, under control of the programmable control means 80. The relay means 84 may preferably comprise solid-state relays. Routine design choice again plays a role in the selection of the specific type or types of relays, if any, employed in particular embodiments, which choice is influenced by the power loads required to operate the heating units 40 employed in the particular system 20.

The programmable control means 80 is preferably a digital signal processor 82, which may comprise any processor programmed to and otherwise capable of rapidly manipulating large quantities of data and of performing large numbers of calculations and analyses. (i.e., in some embodiments, the programmable control means 80 may comprise a known type of programmable logic controller, or PLC). Such manipulations, calculations and analyses may include, but are not necessarily limited to, digitizing signals received in analog form, and comparing the digitized signals with stored sets of reference data. The digital signal processor 82 must also be capable of generating and transmitting signals based on the manipulations, calculations and analyses described herein. The relay means 84 is adapted to receive signals from the digital signal processor and respond to same by supplying respective levels of electrical current to each of the heating units, which quantities are specified by the received signals, and which quantities are in proportion with values indicated by the signals received from the digital signal processor.

In use, the composite structure 12 (in the mould 22, as described above) is positioned between the housing portions 52 and 54, as shown in FIG. 1, and then rested on the lower housing portion 54. The upper housing portion 52 is then lowered until the housing 50 is in its closed configuration, as shown in FIG. 3. Curing of the resin 10 in the composite structure 12 is commenced when heat is applied to the mould 22 by radiation from the heating units 40, which are energized as per an initial state specific to the particular cure cycle, and thereby to one or more of the heatable surface zones 16 as described above. Each of the heatable surface zones 16 is heated at a respective variable heating unit level by the one or more heating units 40 in the particular one or more arrays 42 relating to that heatable surface zone 16. Each of the heatable surface zones 16 is preferably heated at a respective variable heating unit level by a respective array 42 of the heating units through the mould 22. Thus, each cure volume 14 is heated substantially independently of all other cure volumes 14. The selection of initial values of the variable heating unit levels is a matter of routine design choice for one skilled in the art, which choice may be influenced by, among other things, the properties of the particular type of resin 10 being cured, and may advantageously be assisted by the use of computer simulation of curing, using software such as the aforementioned MSC Nastran™.

In use, reference signals representative of respective target ranges of the cure parameters at locations within one or more of the cure volumes may be externally predetermined and input to the programmable control means 80 prior to commencement of the cure cycle. These predeterminations may be assisted by computer simulation of the curing process, or may occur by empirical testing. The reference signals will be predetermined for various locations throughout the one or more cure volumes 14. Further, these locations will preferably substantially correspond to the locations monitored by the cure sensors 77 and temperature sensors 73, and will be predetermined for substantially all times at these locations, from the beginning to the end of the cure cycle of the resin 10 in the particular composite structure 12 being produced by the system 20. The cure parameters include those discussed above, but may also include pre-stored temperature values throughout the composite structure 12 throughout the cure cycle, in addition to other properties relevant to characterizing behaviour of the resin 10 within the composite structure 12 during a cure cycle.

The temperature sensors 73 and cure sensors 77 may preferably be employed to monitor the cure parameters and temperatures within the cure volumes 14 in real, or near real time. More specifically, as the present invention allows for curing of resin 10 in composite structures with a number of cross-sectional thicknesses and variations between same, data with respect to the cure parameters and temperatures may be collected in three dimensional terms, though in some embodiments only temperatures at the surface of the mould 22 will be monitored. The temperature sensors 73 and cure sensors 77 each monitor such data, taking samples on a substantially contemporaneous basis, at a sampling rate generally in the range of about one sample per ten seconds. As curing all of the resin 10 in the composite structure 12 using the present invention can typically require in the approximate range of 60 to 300 minutes to be substantially completed, such a sampling rate facilitates a high level of real time or near real time control of curing of the resin 10 in each cure volume 14 of the composite structure 12. Based on the monitored cure parameters and temperatures, the temperature sensors 73 and cure sensors 77 generate signals indicative of the temperatures and cure parameters, respectively. The temperature sensors 73 and cure sensors each convey their respectively produced signals, typically in analog form, to the programmable control means 80 via the temperature lines 74 and the cure lines 80, respectively. The programmable control means receives the signals from the temperature sensors and cure sensors, and preferably, but not necessarily, converts any analog signals to digital format. The generation and conveyance by each of the temperature sensors 73 and the cure sensors 77 of their respective signals relating to a common location occurs in such close chronological proximity as to be substantially contemporaneous.

The digital signal processor 82 then compares the signals indicative of the cure parameters and/or temperatures as monitored within respective ones of the one or more cure volumes 14 and, more specifically as monitored at one or more particular locations within said cure volumes 14, with respective ones of the one or more reference signals representing respective target ranges of same within those same one or more cure volumes 14 (i.e., specific to a particular location therewithin). The digital signal processor 82 analyses the results of the comparison and correlates the results of the comparison with the temperatures monitored within respective ones of the one or more cure volumes 14 (by comparing the pre-stored temperatures to the monitored temperatures), so as to generate a first set of delta signals in relation to the temperatures and a second set of delta signals in relation to the cure parameters as appropriate. The first set of delta signals are thereafter sent by the control means to the relay means 84 to thereby proportionally vary the level of electrical current respectively supplied by the relay means 84, if employed, and via the particular corresponding relay, to each of the heating units 40 and its respective unit supply line 41. As stated above, the comparison may also result in a second set of delta signals, which are sent by the programmable control means 80 to the relay means 84 to influence the aforesaid variation of the level of electrical current respectively supplied by the relay means 84 (via the particular corresponding relay) to each of the heating units 40.

As a result, the respective variable heating unit level associated with the respective one of the one or more heating units 40 to which the level of electrical current supplied was varied may be varied in a manner conducive to achieving subsequently monitored temperatures and/or cure parameters closer to the target values thereof for the particular location in the respective cure volume 14.

Alterations in variable heating unit levels are localized to correct irregularities in the curing process at the specific locations in particular cure volumes 14 where such irregularities are sensed. The delta signals may be indicative of raising, lowering, or maintaining the respective levels of electrical current supplied to the heating units 40, and thus may result in like changes in variable heating unit 40 levels applied to the composite structure 12 at particular heatable surface zones 16.

By way of example, the signals indicative of temperatures could be such that, the comparison results in a finding that the resin 10 in a particular cure volume has been under heated. A risk could therefore exist of the remaining cure volumes 14 prematurely fully curing, or the composite structure 12 otherwise not curing to an optimal degree. This may produce lines of weakness, and cracks caused by off-gassing or other undesirable by-products, with an accompanying lack of strength and rigidity in any end-product composite part or assembly. In such instances, the first set of delta signals may be generated by the digital signal processor, and transmitted to the heating units 40, such that, subsequent to the transfer, greater watt densities of heat are applied through the heating units 40 to the mould 22 and, as a result, to the composite structure 12. The number of energized heating units 40 in the relevant array 42, and/or the proximity of one or more of the energized heating units 40 in said array 42 could alternatively or in tandem be adjusted (e.g., by translation or vertical movement thereof via the tracks 48). More specifically, such changes would be directed to the particular cure volume 14 where curing was sensed to have been occurring out of step as compared to desired parameters. In the described instance, the real time, or near real time feedback loop control offered by the system 20 of the present invention would allow for complete curing of the resin 10 in the composite structure 12 to be achieved at the appropriate time in the curing cycle (and not before), thereby maintaining the overall strength, rigidity, and quality of the end-product. The composite structure 12 would thus not be spoiled and thereby rendered useless by inconsistent degrees of cure as between different portions of the composite structure 12. This level of control and efficiency is particularly significant in aerospace applications, which demand high strengths and, in many instances, large quantities, and, as such, greater quality control as between one composite part or assembly and the next. This type of real time or near real time continuous corrective action, as facilitated by the ability to closely control the watt density of heat applied to each of the heatable surface zone(s) 16, of the cure volumes 14 of the composite structure 12, and to do so in a highly energy-efficient manner by way of heating units 40 supplying heat by radiation. Moreover, obviating the need to use an autoclave results in significant savings in time, capital, and operating costs.

Other modifications and alterations may be used in the design and manufacture of other embodiments according to the present invention without departing from the spirit and scope of the invention, which is limited only by the accompanying claims. For example, multiple signals are described hereinabove as being transmitted via various lines. One skilled in the art would recognize that these signals could alternatively each be conveyed wirelessly from their sources to their destinations.

Numerous determinations including, among others, the locations and numbers of the heating units, as well as initial levels of the variable heating unit levels are described hereinabove as being assisted by computer simulation using prior art modeling software such as the aforementioned MSC Nastran™. One skilled in the art would recognize that each of these determinations could also be made by, for example, empirical testing. Such empirical testing could include, for example, iteratively curing resin 10 in composite structure 12 while each time using different locations and numbers of, for example, heating units. All other system 20 parameters would be maintained at constant levels, in order to determine an optimum level of the varied parameter, among those values attempted. Similar iterations could, of course, be performed with respect to all other parameters in regard to which computer simulation was discussed. It is noted that, in some instances, the use of computer simulation may be a more cost-effective and less laborious means of making the determinations discussed hereinabove.

The system 20 is shown as including only one programmable control means controlling the curing of resin 10 in but one composite structure 12. One skilled in the art would readily recognize that some embodiments of the present invention could be adapted to perform substantially simultaneous curing of multiple composite structures 12, controlled by one or more programmable control means, still maintaining real time, or near real time control.

The invention claimed is:

1. A system for curing a resin in a composite structure having one or more interconnected cure volumes, said cure volumes having one or more heatable surface zones, said system comprising:
    (a) a mould having:
        (i) a mould base portion adapted to support said composite structure; and
        (ii) a mould closure portion adapted to overlie said mould base portion in sealable relation to define a mould chamber containing said composite structure within; and
    (b) a plurality of heating units each selectively movable with respect to a space relation of the plurality of heating units space relation about said mould;
wherein said heating units transmit heat to said mould by radiation; and
wherein said mould heats one or more of said surface zones.

2. A system according to claim 1, wherein said heating units are adapted to emit said heat to said mould at one or more respective variable heating unit levels.

3. A system according to claim 2, wherein said plurality of heating units comprises one or more arrays of said heating units, wherein each of said arrays comprises one or more of said heating units, and wherein each of said arrays is positionable in operative heating relation to a corresponding one of said heatable surface zones, with said mould interposed therebetween.

4. A system according to claim 3, further comprising a housing shaped, configured and otherwise adapted to selectively enclose said mould, wherein said heating units are mounted on said housing.

5. A system according to claim 4, wherein said heating units are movably mounted on said housing.

6. A system according to claim 5, further comprising means for adjusting the distance between each of said heating units and said mould.

7. A system according to claim 6, wherein said housing comprises two or more matable housing portions; wherein one or more of said matable housing portions are movable so as to be adapted to form an open configuration of said housing and a closed configuration of said housing; wherein in said closed configuration said housing portions are mated in close fitting relation about said mould, and wherein in said open configuration said housing portions are unmated and positioned sufficiently remotely from one another to allow for removal of said mould from therebetween.

8. A system according to claim 7, wherein said housing portions comprise an upper housing portion and a lower housing portion.

9. A system according to claim 8, further comprising one or more temperature sensing means mounted adjacent said mould for monitoring one or more temperatures within said one or more cure volumes.

10. A system according to claim 9, further comprising a programmable control means responsive to one or more of said temperature sensing means, wherein said programmable control means is operatively connected to said heating units and is adapted to vary a rate of curing of said resin within at least one of said one or more cure volumes by varying one or more of said variable heating unit levels.

11. A system according to claim 10, wherein said one or more temperature sensing means are operatively connected to said programmable control means for conveying one or more signals indicative of said temperatures within said one or more cure volumes from said temperature sensing means to said programmable control means.

12. A system according to claim 11, wherein said programmable control means is adapted to compare said signals indicative of said temperatures within respective ones of said one or more cure volumes with respective ones of one or more reference signals representing respective target ranges of said temperatures within each of said one or more cure volumes and to analyse the results of said comparison, so as to generate a first set of delta signals for respective sending by said programmable control means to said heating units to thereby proportionally vary the respective variable heating unit levels of one or more of the heating units in one or more of said arrays of said heating units in a manner conducive to producing values of the temperatures at a subsequent time that are closer to a target value thereof for said respective cure volumes at said subsequent time; wherein said heating units are responsive to said programmable control means and adapted to vary said variable heating unit levels in accordance with said first set of delta signals.

13. A system according to claim 12, wherein said programmable control means varies said variable heating unit levels by varying one or more of:
 (i) the number of energized heating units in one or more of said arrays;
 (ii) the proximity of one or more of the heating units in one or more of said arrays to said mould; and
 (iii) the intensity of the radiation transmitted by one or more of said heating units in one or more of said arrays.

14. A system according to claim 13, further comprising one or more cure sensing means mounted about said mould for monitoring one or more cure parameters within said one or more cure volumes.

15. A system according to claim 14, wherein said cure parameters include one or more of:
 (i) degree of cure of the resin; and
 (ii) viscosity of the resin; within said one or more cure volumes.

16. A system according to claim 15, wherein said programmable control means is responsive to one or more of said cure sensing means.

17. A system according to claim 16, wherein said one or more cure sensing means are operatively connected to said programmable control means for conveying one or more signals indicative of said cure parameters within said one or more cure volumes from said cure sensing means to said programmable control means.

18. A system according to claim 17, wherein said programmable control means is adapted to compare said signals indicative of said temperatures within respective ones of said one or more cure volumes with respective ones of one or more reference signals representing respective target ranges of said temperatures within said one or more cure volumes and to analyse the results of said comparison so as to generate a second set of delta signals for respective sending by said programmable control means to said heating units to thereby proportionally vary the respective variable heating unit levels of one or more of said heating units in one or more of said arrays of said heating units in a manner conducive to producing values of the cure parameters at a subsequent time that are closer to a target value thereof for said respective cure volumes at said subsequent time; wherein said heating units are further adapted to vary said heating unit levels in accordance with said second set of delta signals.

19. A system according to claim 18, wherein each said temperature sensing means comprises one or more temperature sensors for generating said signals indicative of said temperatures.

20. A system according to claim 19, wherein said temperature sensors are thermocouples.

21. A system according to claim 19, wherein said temperature sensors are infrared-based sensors.

22. A system according to claim 20, wherein each of said heating units comprises a halogen light bulb.

23. A system according to claim 22, wherein each said halogen light bulb has a reflector means; wherein said reflector means is aimed to reflect light toward said mould when said housing is in said closed configuration.

24. A system according to claim 23, wherein said cure sensors are selected from a group comprising ultrasonic, resistance, capacitance, electrically and dielectrically based sensors.

25. A system according to claim 24, wherein said programmable control means comprises a digital signal processor.

26. A system according to claim 25, wherein said housing further comprises a mechanism for moving said housing portions between said open configuration and said closed configuration.

27. A system according to claim 1, wherein each of said heating units comprises a halogen light bulb.

28. A system according to claim 1, wherein the plurality of heating units are arranged around the mould so as to operatively heat each of the one or more heatable surface zones.

29. A system according claim 1, wherein each of the plurality of heating units is dynamically movable during a curing process.

30. A system according to claim 29, wherein each of the plurality of heating units is dynamically repositioned based on instructions generated as a result of a feedback response.

* * * * *